US012359818B2

(12) United States Patent
Young (10) Patent No.: US 12,359,818 B2
(45) Date of Patent: Jul. 15, 2025

(54) CONVERTIBLE BIOMASS GASIFICATION STOVE

(71) Applicant: Clifford Kenneth Young, Sonora, CA (US)

(72) Inventor: Clifford Kenneth Young, Sonora, CA (US)

( * ) Notice: Subject to any disclaimer, the term of this patent is extended or adjusted under 35 U.S.C. 154(b) by 510 days.

(21) Appl. No.: 17/590,981

(22) Filed: Feb. 2, 2022

(65) Prior Publication Data
US 2023/0243506 A1     Aug. 3, 2023

(51) Int. Cl.
*F24C 15/08*      (2006.01)
*A47J 33/00*      (2006.01)
*F24B 1/20*       (2006.01)
*F24C 15/10*      (2006.01)

(52) U.S. Cl.
CPC .............. *F24B 1/202* (2013.01); *A47J 33/00* (2013.01); *F24C 15/08* (2013.01); *F24C 15/107* (2013.01)

(58) Field of Classification Search
CPC . F24B 1/202; F24B 1/181; F24B 1/182; A47J 33/00; F24C 15/107; F24C 15/08
See application file for complete search history.

(56) References Cited

U.S. PATENT DOCUMENTS

| | | | | |
|---|---|---|---|---|
| 4,915,091 A | * | 4/1990 | Varney | F24B 1/202 126/29 |
| 5,842,463 A | * | 12/1998 | Hall | A47J 33/00 126/29 |
| 8,469,018 B1 | * | 6/2013 | West | A47J 36/2477 126/30 |
| 10,028,617 B1 | * | 7/2018 | Bourgeois | F24C 3/027 |
| 2017/0205066 A1 | * | 7/2017 | Lirette | F24C 3/027 |
| 2020/0348028 A1 | * | 11/2020 | Quimby | F23M 9/02 |
| 2022/0146106 A1 | * | 5/2022 | Jung | F24C 5/04 |

* cited by examiner

*Primary Examiner* — Alfred Basichas
(74) *Attorney, Agent, or Firm* — Michael E. Klicpera (57) ABSTRACT

The present invention generally provides an improvement upon existing wood-gas stoves, in which the invention makes it possible for a user to start the fire in a well-ventilated single-walled stove configuration, and then easily and instantly convert the stove into a double-walled wood-gas stove configuration for improved start-up and boil times as well as increased fuel efficiency of the stove and reduced smoke particulates emanating therefrom. The invention also improves air flow and pyrolysis efficiency by elevating the canisters above the surface below, allowing less restricted air flow from underneath and a greater distance and time for gas to heat up between the canister walls.

14 Claims, 9 Drawing Sheets

CONVERTIBLE BIOMASS GASIFICATION STOVE

FIELD OF THE INVENTION

The present invention relates generally to wood-gas stoves. More specifically the present invention discloses a novel stove conversion mechanism and methods thereof.

BACKGROUND OF THE INVENTION

Existing wood-gas stoves, also known as gasification stoves or pyrolysis stoves commonly employ a fixed, permanent double-wall configuration. Because of the restricted airflow necessary in wood-gas stoves compared to non-wood-gas stoves, wood-gas stoves tend to be slow in reaching the point at which the gasification or pyrolysis process is in substantial effect. During this start-up phase, wood-gas stoves also typically produce a noticeable amount of smoke. The restricted air flow also makes it more difficult and frustrating for users to start fires in prior-art stoves. Said stoves are commonly constructed in a concentric cylindrical canister arrangement, with a second outer canister fixed in place around a first inner canister, although the shape may vary, such as with a double-walled concentric box arrangement.

Such prior-art stoves are commonly designed to passively induce heated air to flow up between the two walls by thermal convection and then proximally above the burning biomass fuel near the top of the inner canister. In order to constrain the flow of air to flow up between the canister walls, the outer canister typically has no holes in its sides for most of the height of the canister, with the exception of a ring of air intake holes near the bottom of the canister. The inner canister typically also has intake holes in its base and some holes in its wall in the lower region of the canister which allow gases from the heated biofuel and air mixture to feed the fire in the inner canister. Above these lower holes, the inner canister typically has no holes farther up the sides. However, in some prior art wood-gas stoves, there is a ring of small intake holes disposed near the top of the inner canister. In these stoves, the in-turned flange at the top of the outer canister rests upon the top edge of the inner canister, making an effective air seal. Alternatively the top of the inner canister may be permanently bonded to the outer canister, creating an air seal. Air flowing up between the walls of the two canisters is forced to flow into the inner canister through the upper ring of holes in said inner canister. This convection air current induced by kinetic momentum supplies the combusting gases within the inner canister with additional heated oxygen which in turn consumes the unburned particulates in the fire, making said fire substantially free of smoke and more fuel efficient.

Prior art single-wall stoves that do not incorporate an outer canister for purposes of convecting air, are necessarily less efficient with respect to full utilization of the combustible biomass, and they tend to produce undesirable levels of smoke.

Additionally, prior art double-wall gasification stoves have an outer canister that is commonly permanently fixed, i.e., not removable, from the inner canister. This reduces ventilation in the startup phase of fire ignition and as a consequence restricts the air flow feeding the fire. This makes it more difficult to start a fire in a conventional wood-gas stove than in a single-walled stove.

BRIEF SUMMARY OF THE NEW INVENTION

The present invention generally provides an improvement upon existing wood-gas stoves, by enabling the user to begin the fire in just the inner canister, with the outer canister removed. The fire is started with the stove in a single-walled mode without the obstruction of pot supports. Loading of fire wood or biomass fuel is thus easier. Once the fuel in the inner canister is burning strongly, the stove is rapidly and easily converted by the user into a double walled wood-gas configuration by the placement of the canister that comprises the second, outer wall around the canister that comprises the first, inner wall. In its initial single-walled configuration, employing just the inner canister, air flow is less restricted than in its subsequent double-walled configuration. This makes it much easier to get the fire started and become well established along with reduced smoke during the initial start-up phase. Once the fire is burning well, the outer canister can be lowered by the user around the inner canister, thereby converting the stove into a wood-gas stove.

In addition, in the preferred embodiment of the invention, the stove is configured such that an array of supports attached around the outer canister are able to provide both a pot support function above the stove, as well as legs for the outer canister, to raise it to the optimal height above the surface below, which provides ample clearance for heated gases to enter the stove from below and to flow up between the canister walls and from there between the rim of the inner canister and the above overhanging lip of the outer canister. These supports may be offset from the outer canister by means of standoffs, i.e., tube spacers, reducing how hot the supports become, as well as minimizing any heat-induced warpage to said supports, and providing a means of holding and lifting off the outer canister.

In prior-art wood-gas stoves, the inner and outer canisters are typically permanently bonded together with a non-ventilated floor under the outer canister, which sits directly on the ground or surface beneath. This requires the outer canister to have a ring of relatively large air intake holes around its sides, near its base, to allow air into the stove. This reduces air flow and limits the distance that the heated air has to flow up between the canister walls, thereby reducing how hot the gas can become and how efficient and clean the fire burns.

By contrast, in the present invention, both the inner and outer canisters are elevated above the surface below, so that outside air is able to freely enter the inner canister through holes in its floor, where it mixes with combustion gases venting from the rapidly oxidizing, i.e., burning biomass fuel. Air is also able to enter the outer canister from below into the gap between the canister walls. The air and wood-gas mixture in the inner canister moves up through the hot and burning fuel The relatively unimpeded airflow that feeds the fire from below, in conjunction with the convection between the inner and outer walls of said canisters results in greater thermal utilization efficiency of the fuel and improved pyrolysis.

Unlike other wood-gas stoves, the supports in the present invention also raise the outer canister above the surface below such that there is no need for a ring of air intake holes around the lower reaches of the outer canister. Instead of entering through side intake holes, air is able to enter the gap between the two canisters from below the canisters. A benefit of this is that the air has more distance to travel up between the canister walls, giving the air more time to be heated as well as greater kinetic energy which results in the gas being hotter by the time it flows into the inner canister near the top of the stove. This in turn generates a hotter and virtually smoke free combustion process, i.e., a more efficient and cleaner fire.

In addition, in the preferred embodiment of the invention, the inner canister is attached to a platter, i.e., a thermally conductive disk, beneath the stove, which serves as an ash and ember catcher, as well as a means to disperse concentrated heat radiating from the stove's fire box, i.e., inner canister. This protects wooden table tops from being overheated in a small area, whilst it enables flatbread, e.g., a tortilla, that may optionally be placed under said disk to be optimally heated, as eggs, or other food is being concurrently cooked in a pan resting on top of said supports.

To maximize heat absorption and transference to the flatbread, the platter is optimally coated on both sides by a dark heat-absorbing finish, such as a black or dark green anodizing, or other heat-tolerant coating material such as ceramics or Polytetrafluoroethylene (PTFE). In the preferred embodiment, one or more handles are attached to the platter which provides a safe and convenient means of moving the stove and of emptying ashes out of the stove after use.

The components of the invention should be made from heat-tolerant metal alloys typically used for stoves, such as stainless steel or titanium. Some components, such as the platter, which do not become as hot as the canisters, may be made from metals with a higher thermal conductivity such as titanium or aluminum, or a lower melting point, such as aluminum.

BRIEF DESCRIPTION OF THE DRAWINGS

The drawings constitute a part of this specification and include exemplary embodiments of the present invention illustrating various objects and features thereof.

FIG. 1 is a perspective view of the invention, according to some embodiments. The outer canister with attached supports is in place around the inner canister, which is itself bolted to the circular platter below, and with tube spacers, i.e. standoffs; used to elevate the inner canister above the platter. Attached to the platter by means of bolts and wingnuts is a metal handle with an insulated grip made from a material such as wood. The stove can alternatively have two more compact handles attached to two opposing sides of the platter, according to other embodiments of the invention.

FIG. 4 is a perspective view of the invention, in which the inner and outer canisters have been partially cut away in order to reveal their interior details. The ventilation holes in the floor of the inner canister can be seen, as well as the bolts and nuts that secure the inner canister to the platter below. The gap between the walls of the inner and outer canisters is also evident. Once a fire is established in the stove, air entering the inner canister from below mixes with gases emitted from the heated fuel in the inner canister. This mixture will flow upward through the burning fuel. As air rises between the canister walls it is progressively heated by the hot metal walls of the stove, which improves the efficiency of the pyrolysis, such that most of the particulates in the gases are combusted, which virtually eliminates the amount of smoke rising out of the stove. The leg supports attached around the outer canister are configured to support a pot, pan or consumable food items such as typical bread, flat bread or pita bread as well are other consumable foods.

COMMON COMPONENTS AND TECHNOLOGY TO ALL EMBODIMENTS

Common Operation to the Present Invention

100 The stove invention
110 Outer canister

112 Bolt holes in outer canister
120 Inner canister
122 Ventilation holes
124 Vent Holes near top of inner canister in alternative embodiment of the present invention
126 Bolt holes in base of inner canister
128 Upper Rim of inner canister
130 Support
132 Foot section of Support
134 Horizontal pot support section of Support
135 Holes in supports for inserting one or more fire pokers or skewers to safely lower down as well as to lift off the outer canister, in order to convert the stove to and from a single-walled and double-walled stove
136 Side Tube Spacers, i.e. standoffs, for distancing the supports from the outer canister
138 Support Bolts
139 Support Nuts
140 Platter
142 Tube Spacers, i.e. standoffs, between platter and inner canister base
144 Base bolts for attaching inner canister to platter
146 Base nuts
148 Bolt holes in platter
150 Handle
152 Metal core of handle
154 Bolts for attaching handle to platter
156 Wingnuts for attaching handle to platter
158 Insulated gripper section of handle
170 Folding handle
152 Hinge on folding handle
174 Anchor plate for folding handle
200 Cooking implement, depicted here as a skillet
300 Wood board, or other mostly flat heat-tolerant surface
310 Flatbread such as a tortilla, pita bread or pizza bread.

DETAILED DESCRIPTION OF THE DRAWINGS

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting; but merely as a basis for the claims and a representative basis for teaching one skilled in the art of how to variously employ the invention in virtually any appropriately detailed structure.

Certain terminology will be used in the following description for convenience in reference only and ought not be construed as limiting or restricting the scope of the design. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned; derivatives thereof and words of similar meaning.

Figure 1:
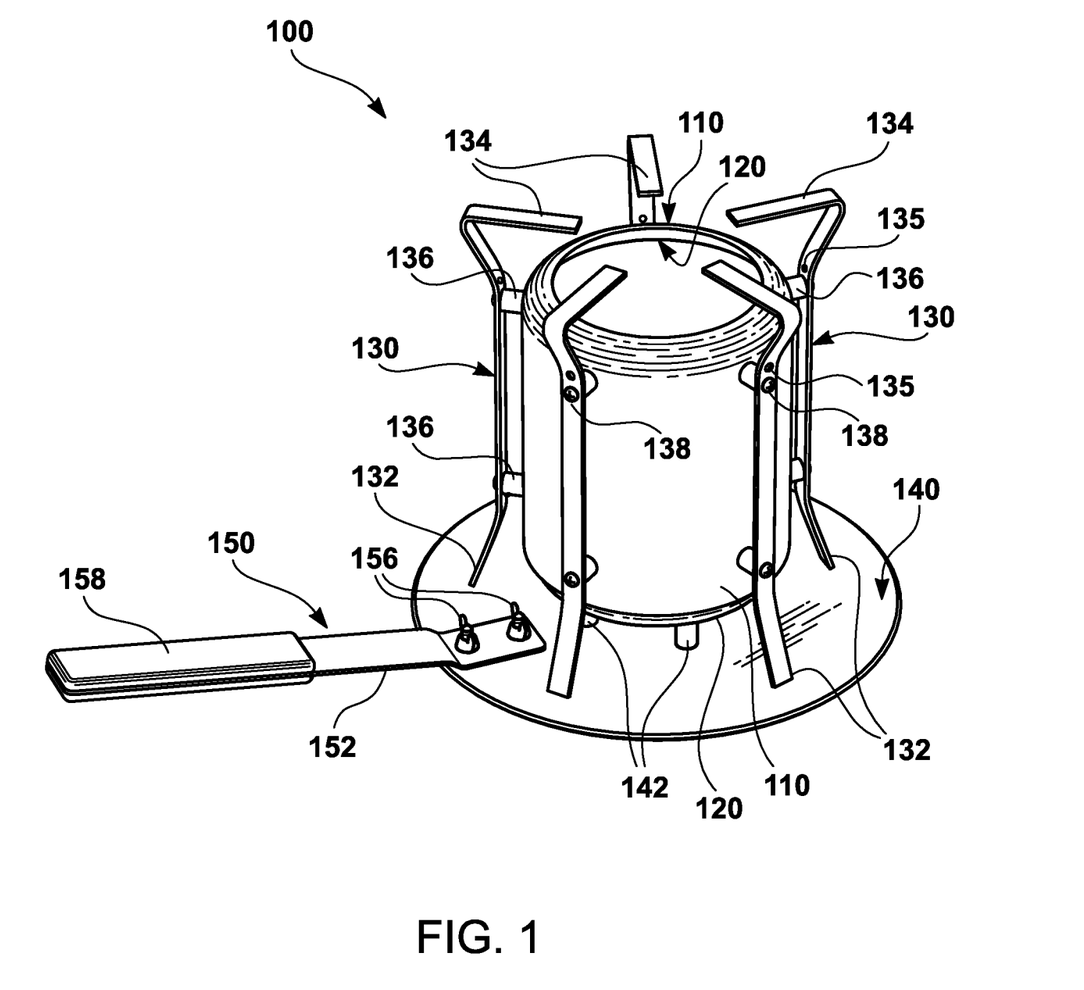

FIG. 1 is a perspective view of the stove invention 100, according to some embodiments. The outer canister 110 with attached supports 130 is in place around the inner canister 120, which is itself bolted to the circular platter 140 below, and with tube spacers 142 used to elevate the inner canister 120 above the platter 130. Attached to the platter 140 by means of bolts and wingnuts 156 is a handle 150 with a metal core 152, and an insulated grip 158 made from a material such as wood. The stove 100 can alternatively have two more compact handles attached to two opposing sides of the platter, according to other embodiments of the invention. Supports 130 are bolted to the outer canister 110 by means of bolts 138 and nuts 139, and are separated from the outer canister by means of tube spacers 136 through which said bolts pass. In addition, said supports may incorporate apertures 135. These apertures 135 enable the user to use one or more metal fire pokers, skewers, tent pegs or sturdy wires to safely manipulate and lower the outer canister 110 around the inner canister 120, as well as lift it off, by inserting said fire poker into said apertures. The supports are formed such that their lower leg sections 132 rest on the platter 140 thereby elevating the outer canister 110 above the platter 140 to the height necessary for convected air between the canister walls to have the optimal flow into the burn area in the inner canister 120 over the upper rim of said inner canister. The supports are also formed such that their upper extents 134 are horizontal in order to form a broad and level platform upon which cooking implements may be placed.

Figure 2A:
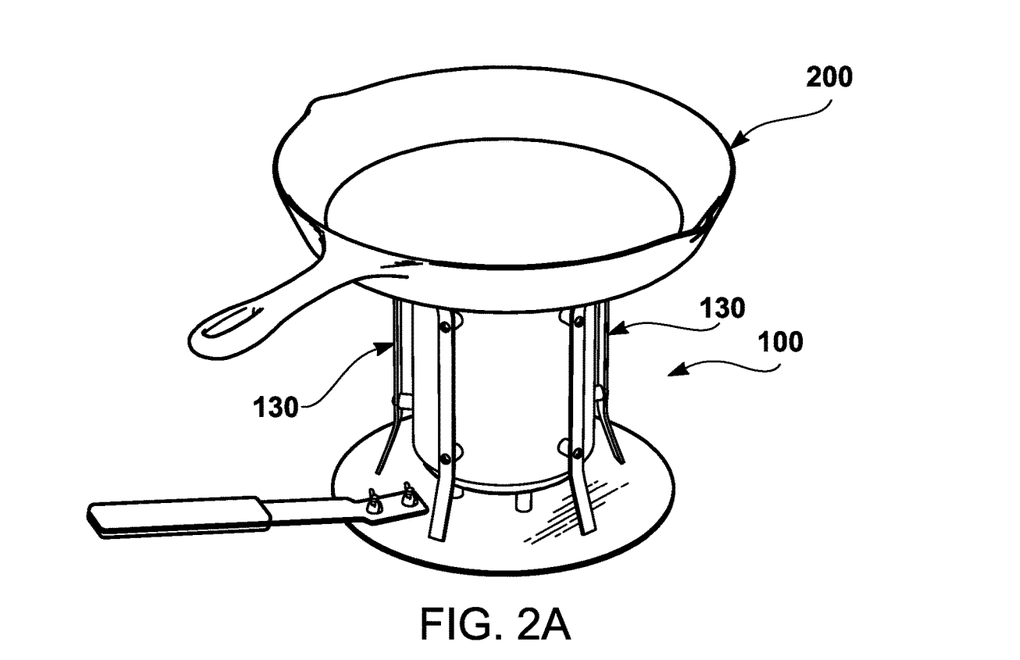
FIGS. 2A-B are perspective views of the stove with a skillet resting on top of the stove supports. Said supports form a level platform on top of the stove which can support both narrow and wide cooking implements such as pots, pans, skillets, kettles, Dutch ovens, grills and griddles, mugs, canteens, etc.
Figure 2B:
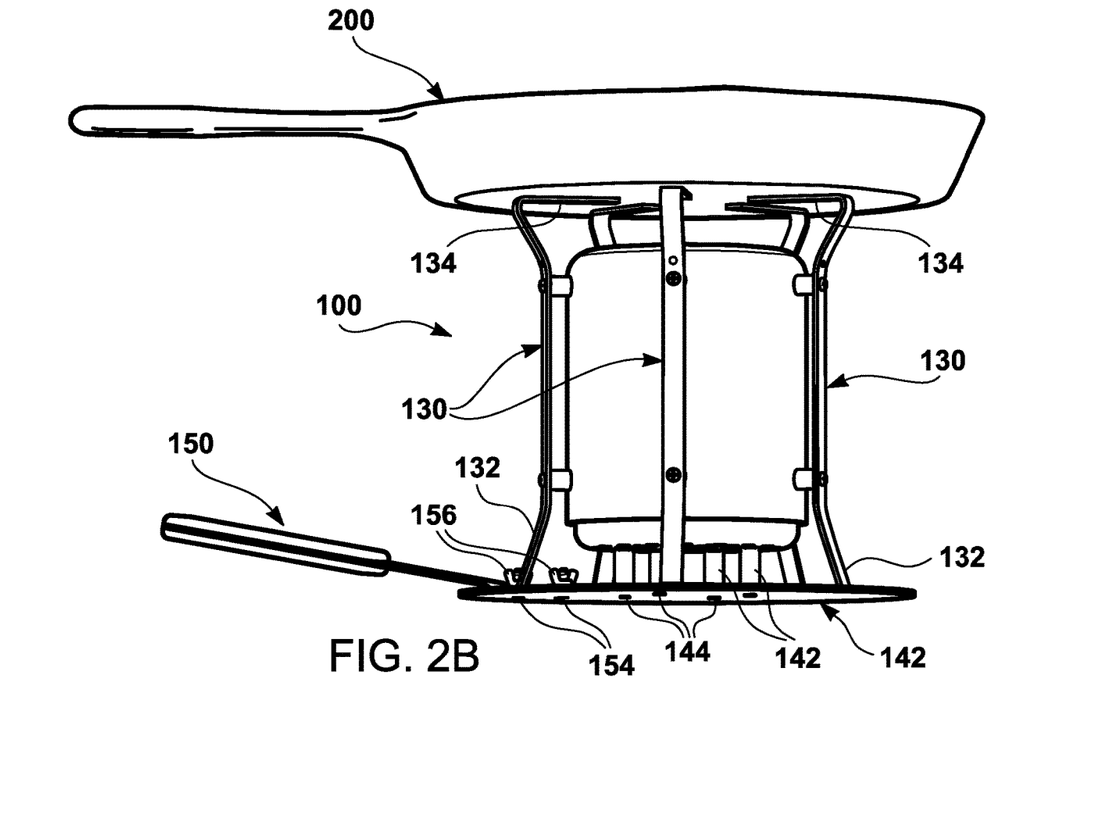

FIGS. 2A-B depict upper and lower perspective views, respectively, of the stove 100 with a skillet 200 resting on top of the horizontal extents 134 of the supports 130. Said supports 130 provide a level platform above the stove which can support both narrow and wide cooking implements such as pots, pans, skillets, kettles, Dutch ovens, grills and griddles, mugs and canteens, etc.

Figure 3:
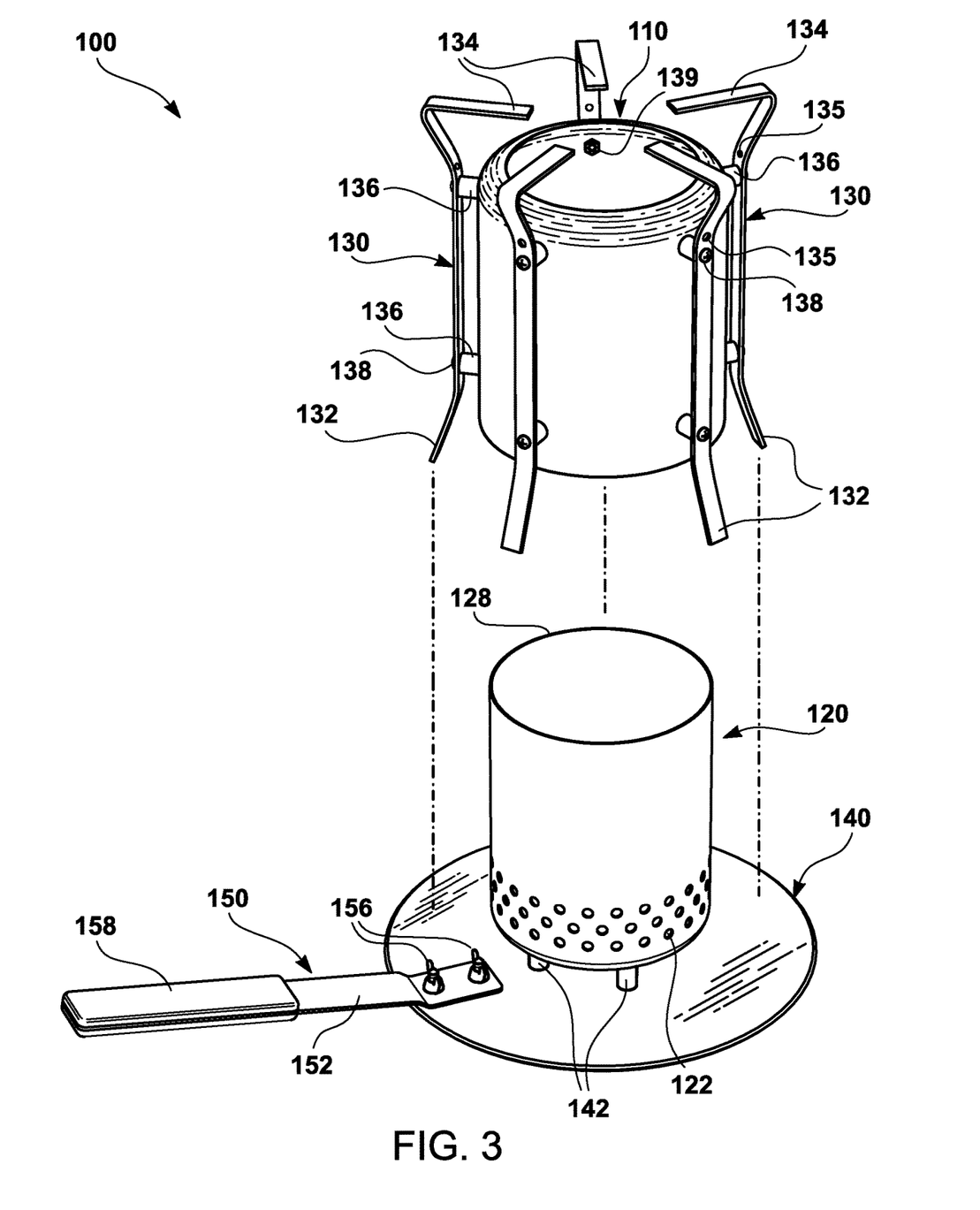
FIG. 3 is a perspective view of the stove with the outer canister with its attached supports removed from the inner canister. The inner canister is affixed by means of bolts and tube spacers to the platter below. The handle is also affixed to the platter. Holes surrounding the lower region of the inner canister can be seen. In addition to these, the floor of the inner canister is also perforated with multiple ventilation holes (said holes are not visible in this view). With the outer canister removed, biomass fuel can be placed into the inner canister and the fire started. With the stove in its single-canister state, the combustible fuel such as biomass (i.e., wood or charcoal, etc.), is easier to load into the stove, and the fire is easier to start in this well-ventilated single-canister configuration. Once the fire is well established, the outer canister can be placed back around the inner canister, transforming the stove to a wood-gas stove, and beginning the pyrolysis process.

FIG. 3 is a perspective view of the stove 100 with the outer canister 110, with its attached supports 130, removed from around the inner canister 120. The inner canister 120 is affixed by means of bolts 144 and nuts 146 and tube spacers 142 to the platter 140 below, with the tube spacers 142 shrouding said bolts and elevating the inner canister 120 above the platter 140 which facilitates air flow through the floor of the inner canister and also reduces the transfer of heat from the fire to the surface below the stove assembly. The handle 150 is also affixed to the platter 140 by means of bolts and wingnuts 156. Air intake holes 122 surrounding the lower region of the inner canister 120 can be seen. In addition to these holes, the floor of the canister is also perforated with multiple ventilation holes, which are not visible in this view. With the outer canister 110 removed, biomass fuel can be placed into the inner canister and the fire started. With the stove in its single-canister state, the combustible fuel such as biomass (e.g. wood sticks, twigs, etc.) or charcoal, etc., is easier to load into the stove, and the fire is easier to start in this well-ventilated single-canister configuration. Once the fire is well established, the outer canister 110 can be placed back around the inner canister 120, transforming the stove to a wood-gas stove, and beginning the pyrolysis process.

Figure 4:
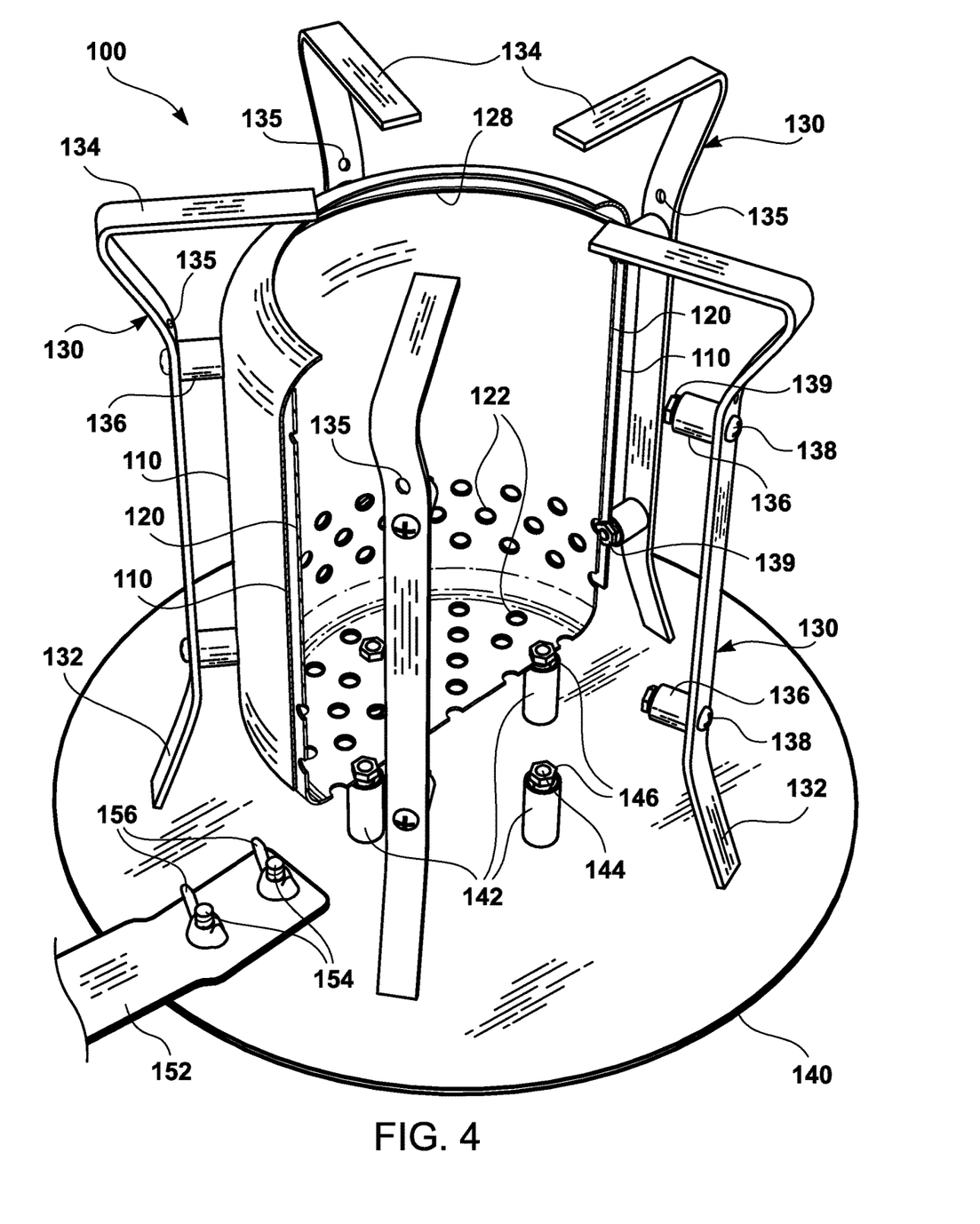

FIG. 4 is a perspective view of the stove 100, in which the inner and outer canisters have been partially cut away in order to reveal their interior details. The ventilation holes 122 in the walls and floor of the inner canister 120 can be seen, as well as the bolts 144 and nuts 146 that secure the inner canister to the platter below, with tube spacers 142 elevating the inner canister 120 above the platter 140. The gap between the walls of the inner and outer canisters is also evident. Once a fire is established in the stove, air entering the inner canister 120 from below mixes with gasses emitted from the heated fuel in the inner canister. This mixture will flow up through the burning fuel. As air rises between the canister walls it is progressively heated by the hot metal walls of the stove, which improves the efficiency of the pyrolysis, such that most of the particulates in the gasses are combusted, which virtually eliminates the amount of smoke rising out of the stove.

Figure 5:
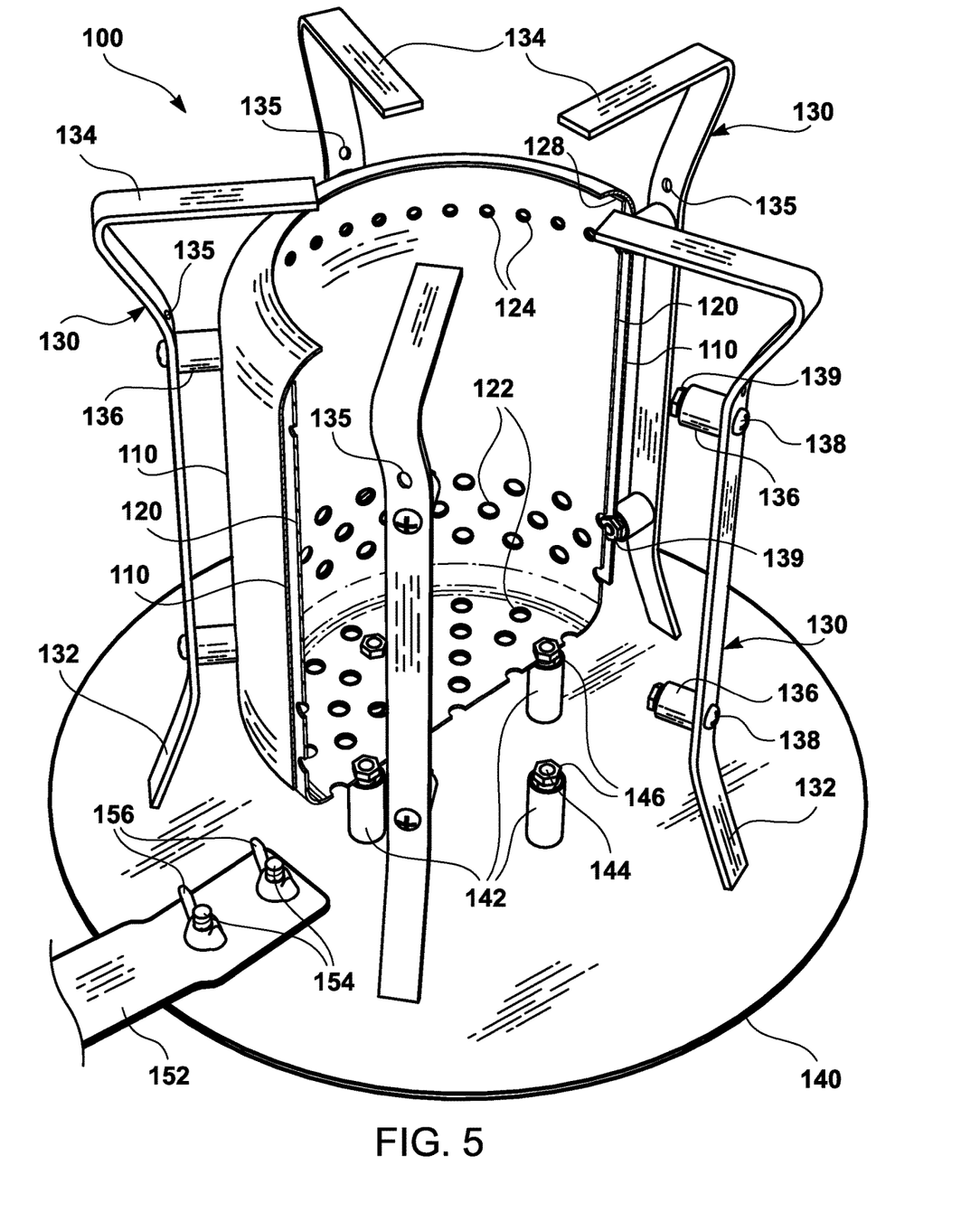
FIG. 5 is a perspective view depicting an alternative embodiment of the invention, in which the inner canister wall incorporates a ring of holes near its top. In this configuration, most of the air that flows up between the walls of the two canisters enters the inner canister through this ring of holes nearest the top of the inner canister. In order to restrict the flow of gas over the rim of the inner canister and direct most of said gas through the ring of holes near the top of the inner canister, the inner canister rim reaches higher than in the previously depicted embodiment, such that the rim ideally would touch the overhanging lip of the outer canister, so that the convection air between the canister walls can only enter the inner canister via the air intake holes near the top of the canister. In an embodiment with top holes in the inner canister, a fan may optionally be incorporated below the stove or to one side with piping to boost air flow through the stove.

FIG. 5 is a perspective view depicting an alternative embodiment of the stove 100, in which the inner canister wall incorporates a ring of holes 124 near its top. In this configuration, most of the air that flows up between the walls of the two canisters enters the inner canister through this ring of holes 124 nearest the top of the inner canister. In order to restrict the flow of gas over the rim of the inner canister and direct most of said gas through the ring of holes 124, the inner canister rim 128 reaches higher than in the previously depicted embodiment, such that the rim 128 ideally would touch the overhanging lip of the outer canister 110, so that the convected air between the canister walls can only enter the inner canister via the air intake holes 124 near the top of the canister.

Figure 6A:
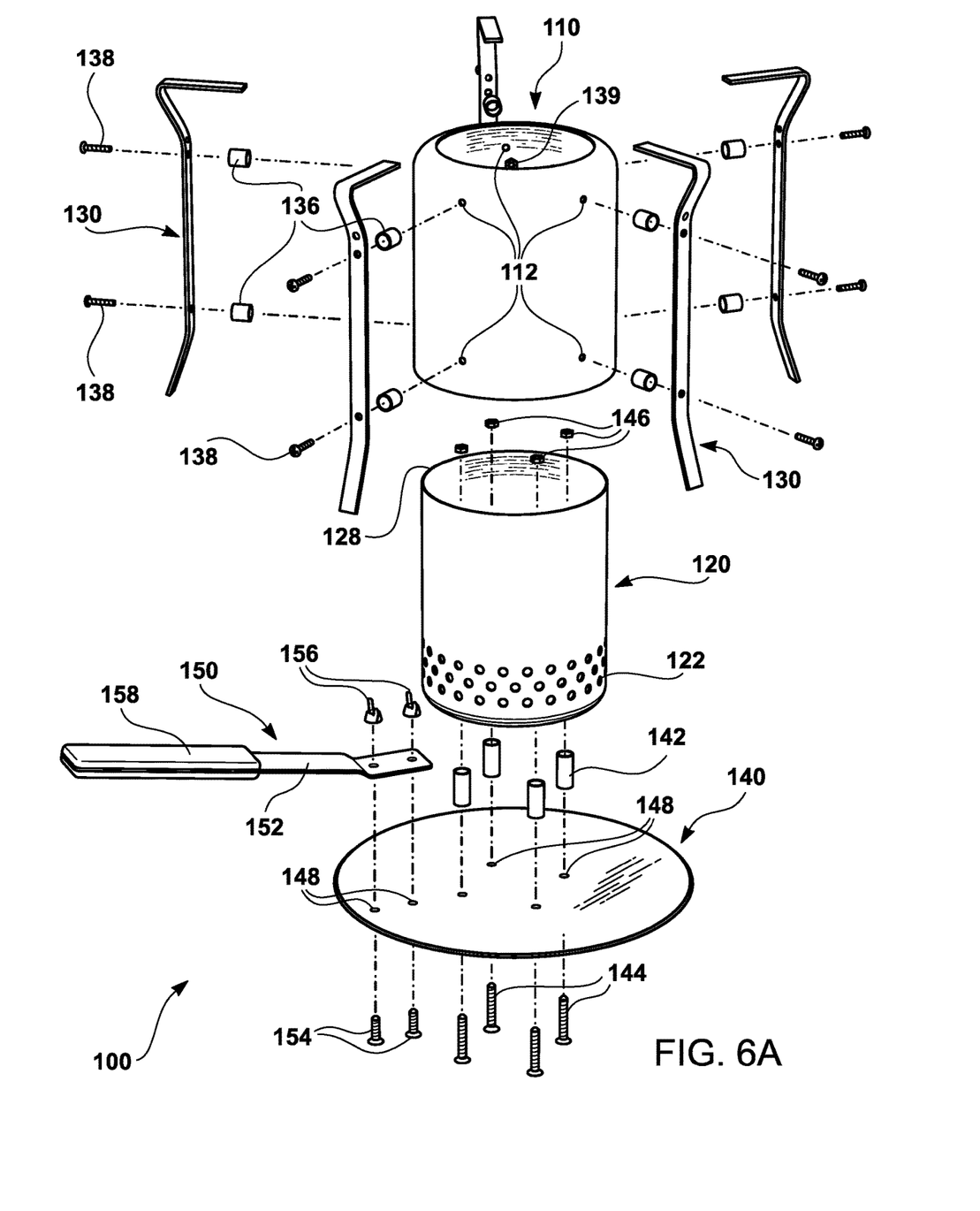
FIGS. 6A-B are perspective views of the invention exploded into its component parts. The shape of the inner and outer canisters are shown in cylindrical configuration. It is anticipated by the Applicant that the configuration of the inner and outer canisters can also be square or polygon.
Figure 6B:
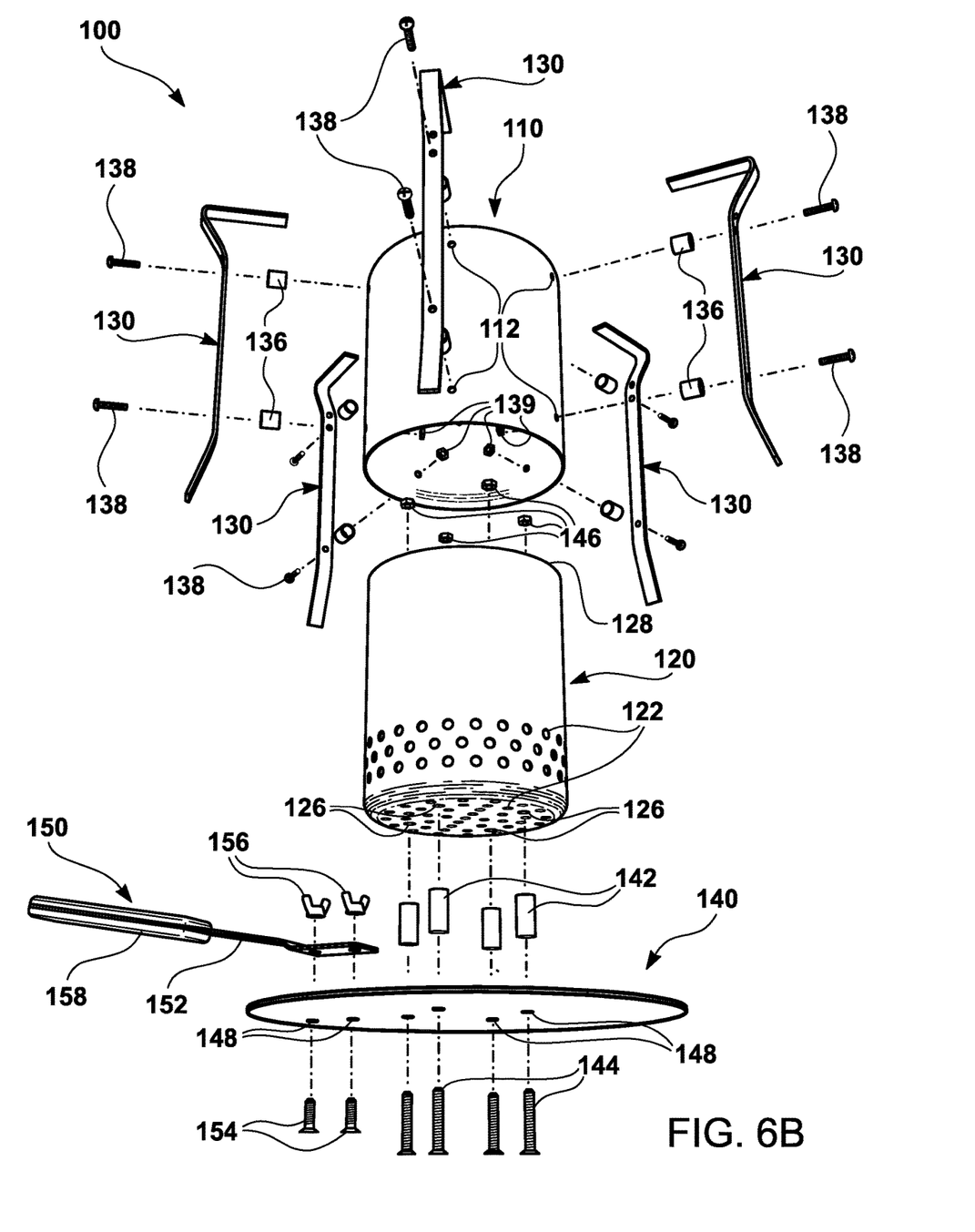

FIGS. 6A-B are perspective views of the stove 100 exploded into its component parts. FIG. 6A is a view from above and FIG. 6B is a view from below the stove. Elements not clearly visible in other figures, such as bolt holes 112 in the outer canister 110, bolt holes 126 in the inner canister 120, and bolt holes 148 in the platter 140 can be seen in these views.

Figure 7:
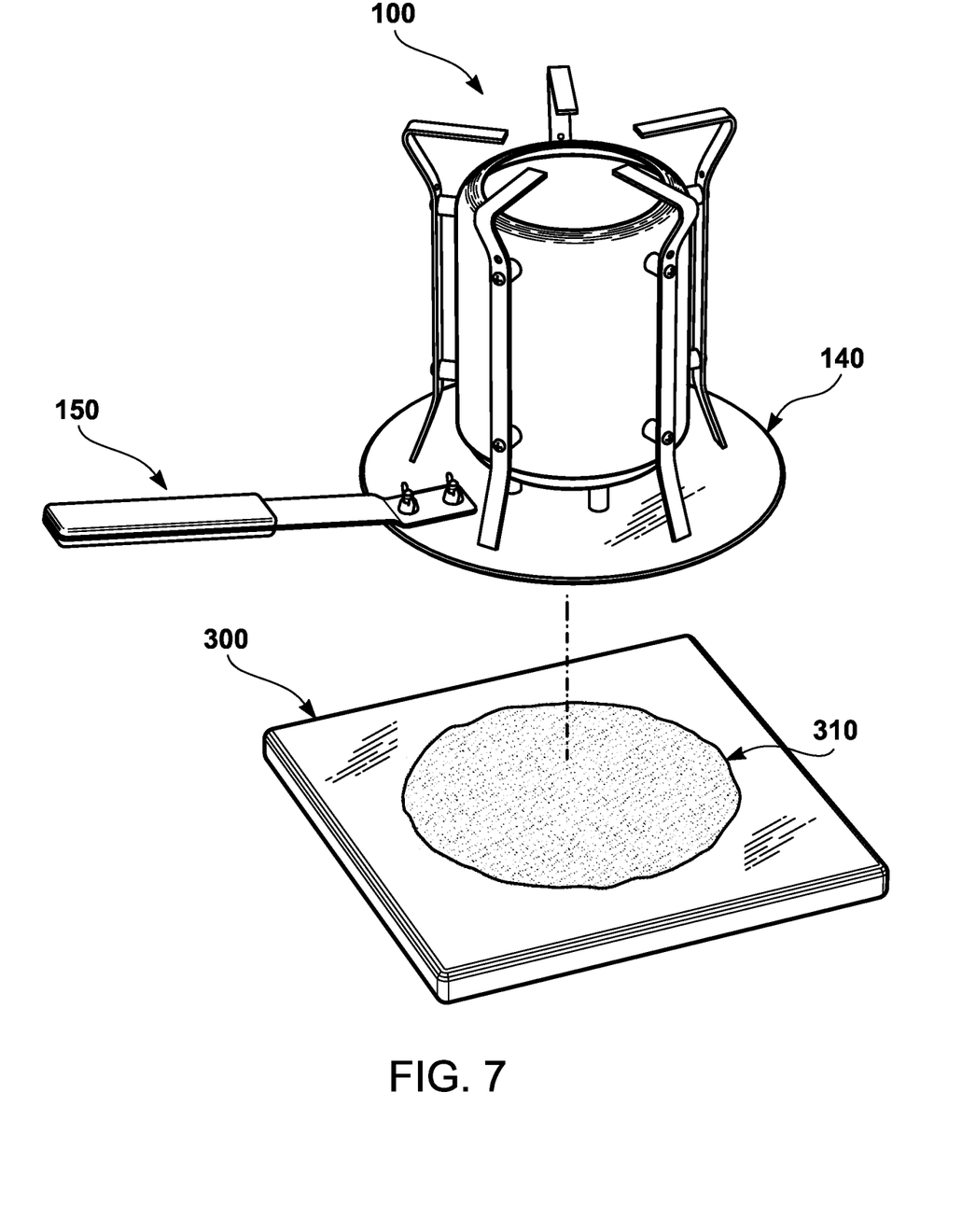
FIG. 7 is a perspective view of the invention above a wooden board or other mostly flat semi-heat-tolerant surface, upon which has been placed a flatbread, such as a tortilla or pita bread. The stove platter is to be placed down upon said flatbread. This illustrates an added benefit to the stove, whereby the user is able to heat a flatbread underneath the platter, which absorbs some heat from the fire in the stove and transfers it to the flatbread. This can be performed while the user cooks food to be wrapped in the flatbread in a pan or pot or grill, etc. on top of the stove. The platter may be composed of a dark metal or have a dark coating such as a black anodizing or powder coating, to increase its heat absorption performance.

FIG. 7 is a perspective view of the stove 100 above a wooden board 300 or other mostly flat semi-heat-tolerant surface, upon which has been placed a flatbread 310, such as a tortilla or pita bread. The stove 100 is to be placed down upon said flatbread. When the user makes a fire in the stove, some radiant heat energy from the fire is absorbed by the platter 300, and some of this heat energy is in turn transferred into the flatbread 310 that is sandwiched between the platter 140 and the wooden board 300 below.

Figure 8A:
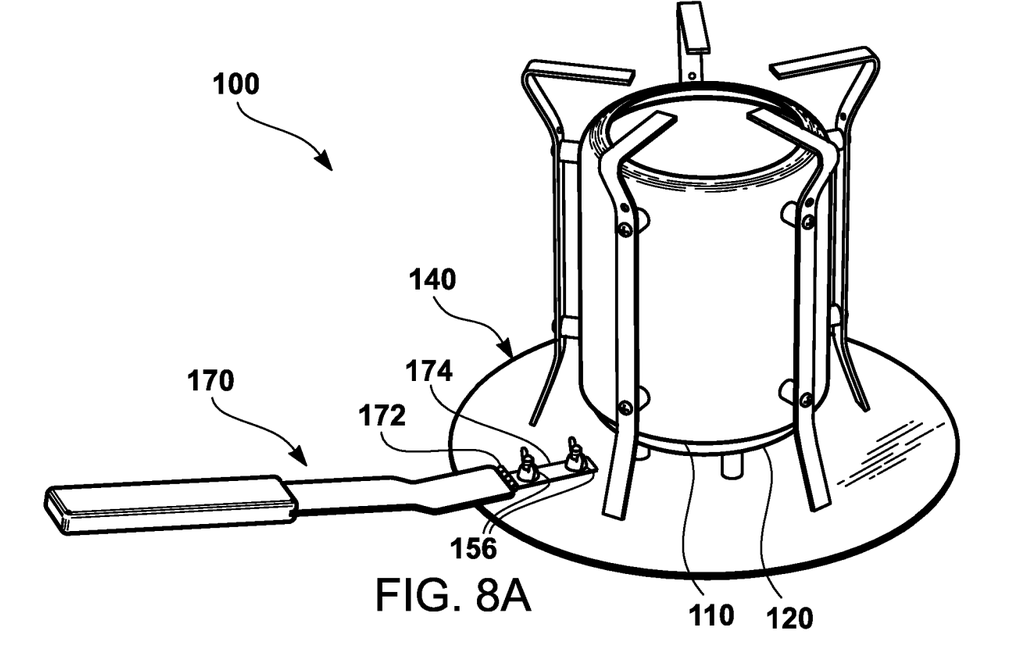
FIGS. 8A and 8B are perspective views of an embodiment of the stove in which an folding handle has been configured such that it can fold up for more compact storage of the stove, as depicted in FIG. 8B. The stove may alternatively be configured with a non-folding detachable handle for compact storage. Such a handle could be inserted a slot that is permanently affixed to the patter below, and tightened or held in place by various means such as one or more wingnuts and bolts.
Figure 8B:
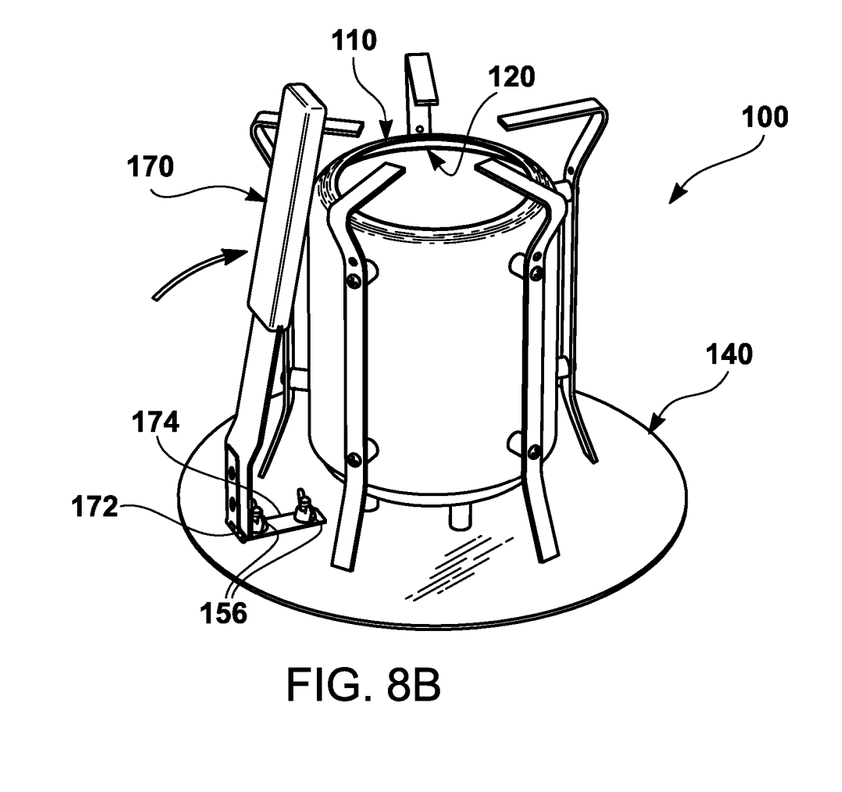

FIGS. 8A and 8B are perspective views of an embodiment of the stove in which an folding handle 170 has been configured such that it can fold up for more compact storage of the stove, as depicted in FIG. 8B, Said handle incorporates a hinge 172, which is connected to an anchoring plate 174, which is bolted to the platter 140, according to some embodiments.

The invention claimed is:

1. A stove for facilitating the conversion of a biomass or wood burning fuel source comprising;
    an inner canister having a cylindrical, square or polygon configuration, the inner canister having a side wall portion and a bottom portion;
    the inner canister having a plurality of holes located in a lower half of the side wall section, wherein the plurality of holes provide aeration for the stove to facilitate thermal utilization efficiency of a biomass or wood fuel and improving pyrolysis;
    a base platform;
    the inner canister is configured to raise the bottom portion above the base platform utilizing three or more spacers that engage the base platform;
    an outer canister having an outer cylindrical, square or hexagon configuration and designed to have a coaxial association with the inner canister, the outer canister having a top area and an outer surface, the top area that is curved inward to further promote thermal utilization efficiency of the biomass or wood fuel and improving the pyrolysis condition;
    the outer canister having three or more leg supports located a distance from the outer surface separated by one or more spacers, the leg supports have a bottom section and a top section, the bottom section is angled outward to provide support for the stove, the top portion of the leg supports have an inward angle wherein the three or more supports providing a pan supported above the inward curved area of the top portion;
    wherein the three or more leg supports attain a configuration that functions to hold the outer canister at a defined height above the inner canister;
    wherein the leg supports include one or more holes near the top area configured to lift the outer cylindrical canister from the inner cylindrical canister using one or more lifting members or fire pokers inserted therein.

2. A stove for facilitating the conversion of a biomass or wood burning fuel source as recited in claim 1, wherein the base platform is substantially flat and configured to serve as an ash catcher.

3. A stove for facilitating the conversion of a biomass or wood burning fuel source as recited in claim 1, is configured to convey heat to edible consumables underneath the platform.

4. A stove for facilitating the conversion of a biomass or wood burning fuel source as recited in claim 1, further comprising one or more handles removably attached to the platform.

5. A stove for facilitating the conversion of a biomass or wood burning fuel source as recited in claim 4, wherein one or more handles are configured to facilitate easy and safe movement of the stove when the stove is hot.

6. A stove for facilitating the conversion of a biomass or wood burning fuel source as recited in claim 4, wherein the one or more handles are configured to facilitate inversion of the stove once the outer canister is removed to empty any ash remaining in the stove after use.

7. A stove for facilitating the conversion of a biomass or wood burning fuel source as recited in claim 1, wherein the three or more leg supports capable of extending from a closed position to an open position.

8. A stove for facilitating the conversion of a biomass or wood burning fuel source comprising;
    an inner canister having a cylindrical, square or polygon configuration, the inner canister having a side wall portion and a bottom portion;
    the inner canister having a plurality of holes located in the lower half of the side wall section, wherein the plurality of holes provide aeration for the stove to facilitate thermal utilization efficiency of the biomass or wood fuel and improving pyrolysis;
    a base platform;
    the inner canister is configured to raise the bottom portion above the base platform by three or more spacers that engage the base platform;
    wherein the inner canister is single-walled configuration with air flow less restricted than in its subsequent double-walled configuration allowing the user a easier method to get the fire started and become well established along with reduced smoke during the initial start-up phase;
    an outer canister having an outer cylindrical, square or hexagon configuration and designed to have a coaxial association with the inner canister, the outer canister having a top area and an outer surface, the top area that is curved inward to further promote thermal utilization efficiency of the biomass or wood fuel and improving the pyrolysis condition;
    the outer canister having a three or more legs support located a distance from the outer surface separated by spacers, the leg supports have a bottom section and a top section, the bottom section is angled outward to provide support for the stove, the top portion of the leg supports have an inward angle wherein the three or more supports providing a pan supported above the inward curved area of the top portion;

wherein the three or more leg supports attain a configuration that functions to hold the outer canister at a defined height above the inner canister;

wherein the leg supports attached around the outer canister are configured to support a pot, pan or consumable food items and functions to raise it to the optimal height above the surface below, wherein ample clearance for heated gases to enter the stove from below and to flow up between the canister walls and from there between the rim of the inner canister and the above overhanging lip of the outer canister.

9. A stove for facilitating the conversion of a biomass or wood burning fuel source as recited in claim 8, further comprising a base platform is substantially flat and configured to serve as an ash catcher.

10. A stove for facilitating the conversion of a biomass or wood burning fuel source as recited in claim 8, is configured to convey heat to edible consumables underneath the platform.

11. A stove for facilitating the conversion of a biomass or wood burning fuel source as recited in claim 8, further comprising one or more handles removably attached to the platform.

12. A stove for facilitating the conversion of a biomass or wood burning fuel source as recited in claim 11, wherein two or more handles are configured to facilitate easy and safe moving of the stove when the stove is hot.

13. A stove for facilitating the conversion of a biomass or wood burning fuel source as recited in claim 11, wherein the one or more handles are configured to facilitate inversion of the stove once the outer canister is removed to empty any ash remaining in the stove after use.

14. A stove for facilitating the conversion of a biomass or wood burning fuel source as recited in claim 8, wherein the three or more leg supports are capable of extending from a closed position to an open position.

* * * * *